Dec. 22, 1964

H. A. THOMAS ETAL
ROD DRIVE SYSTEM FOR USE WITH NEGATIVE
TEMPERATURE COEFFICIENT REACTOR 3,162,579

Filed Aug. 9, 1960

INVENTORS
BY HAROLD A THOMAS
CHARLES E. CLIFFORD

ATTYS

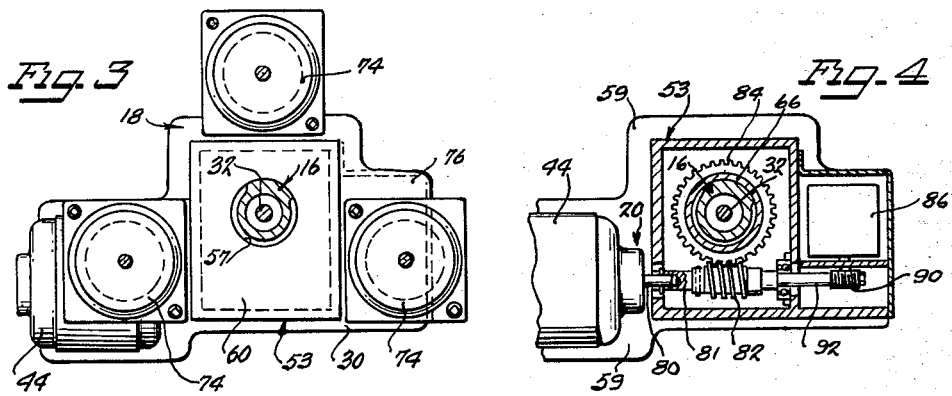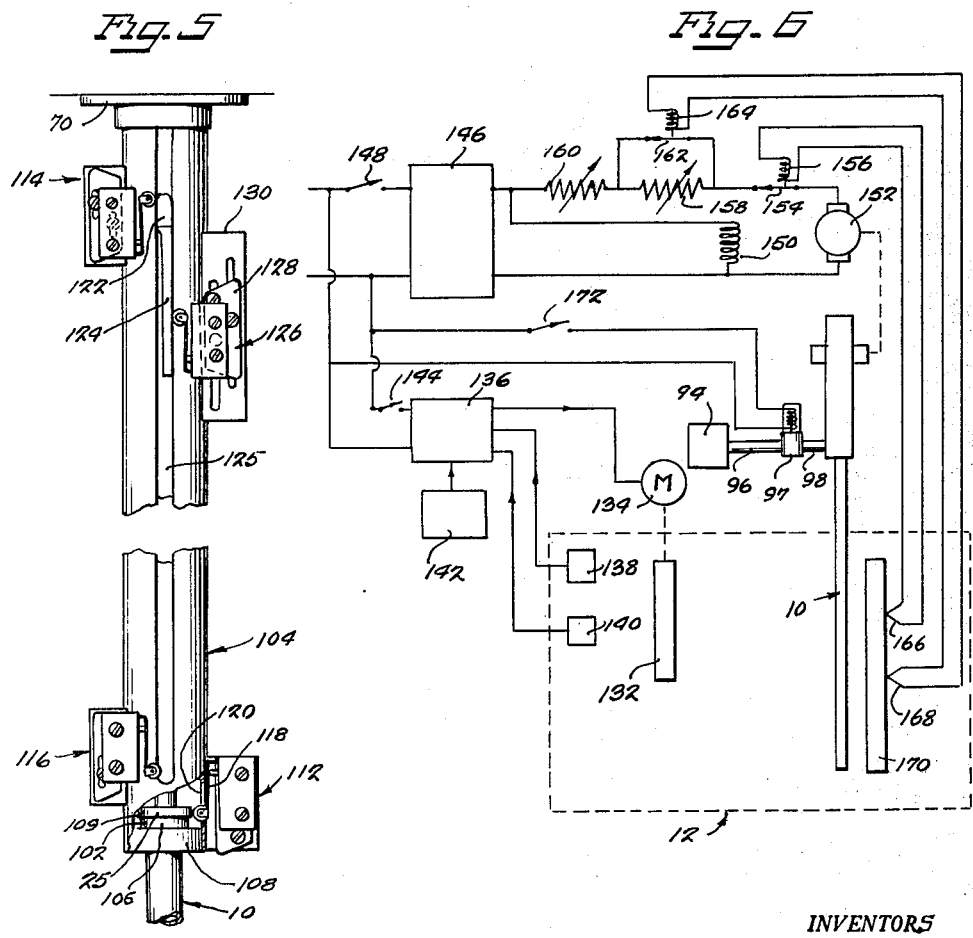

United States Patent Office 3,162,579
Patented Dec. 22, 1964

3,162,579
ROD DRIVE SYSTEM FOR USE WITH NEGATIVE
TEMPERATURE COEFFICIENT REACTOR
Harold A. Thomas, San Diego, and Charles E. Clifford,
Del Mar, Calif., assignors to General Dynamics Corporation, New York, N.Y., a corporation of Delaware
Filed Aug. 9, 1960, Ser. No. 48,419
8 Claims. (Cl. 176—36)

The present invention relates to a control rod drive system for a nuclear reactor and more particularly to a control rod drive system for controlling the steady state and transient operation of a nuclear reactor.

A nuclear reactor generally includes an active core containing fuel (fissionable material), a moderating material, a reflector to conserve escaping neutrons, control and measuring elements, provision for heat removal, and suitable shielding.

When a reactor is constructed, it contains more than the critical amount of fissionable fuel so that the effective multiplication factor (i.e., the ratio of the number of neutrons produced by fission in each generation to the number of neutrons present in the preceding generation) can be made greater than unity. Normally, the multiplication factor is controlled by the introduction into the reactor of one or more control rods which absorb neutrons in the reactor.

The power output of a reactor is proportional to the density of neutrons in the reactor. A change in power output can be readily caused, either by withdrawing the control rod to make the multiplication factor greater than one, thereby increasing the power output, or by inserting the control rod to make the multiplication factor less than one, thereby decreasing the power output, and then, when the power reaches a desired level, moving the control rod sufficiently to restore the multiplication factor to one again. In a given reactor, the rate at which the neutron density, and therefore power output, increases or decreases depends upon the amount by which the multiplication factor is greater or less, respectively, than unity. To shut down the reactor, the control rod is inserted to make the multiplication factor considerably less than unity, thereby causing neutron density and the power output to decrease to a negligible level.

To effectively control the operation of the reactor, it is necessary to provide the reactor with a control system which positions and maintains the control rod at any desired position in the core of the reactor. Also, it is necessary to provide the control system with means for suddenly shutting down the reactor for safety or other reasons.

Normally, in a reactor, a sudden increase in reactivity (i.e., the departure of a reactor from critical), unless instantaneously reduced, may increase the power of the reactor to a dangerous level. However, reactors such as the Triga reactors which are manufactured and sold by the assignee of this invention, are inherently safe because they exhibit a large, prompt negative temperature coefficient (i.e., the reactivity decreases as the temperature of the fuel increases). One form of the Triga reactor is described in a copending application, Serial No. 732,415, filed on May 9, 1958, now U.S. Patent 3,127,325.

It is desirable to provide the control system of such reactors with means for rapidly and automatically starting up the reactor or raising its power to a predetermined level. Also, for various purposes, it is desirable in certain of such reactors to pulse the reactor (i.e., to momentarily raise the power to a very high level) or to step the reactor (i.e., to raise the power level to some arbitrary high level for a given period of time).

An object of the present invention is the provision of a control system for a nuclear reactor which provides one or more of the above features. Another object of the invention is the provision of a control system for controlling the steady state and transient operation of a reactor. A further object of the invention is to provide automatic control means for providing a stepped power level rise in the reactor. A further object is the provision of a control system for a nuclear reactor, which system is inexpensive to manufacture and durable in operation.

Other objects and advantages of the present invention will become apparent by reference to the following description and accompanying drawings.

In the drawings:

FIGURE 3 is a horizontal cross-sectional view taken generally along line 3—3 of FIGURE 2;

FIGURE 4 is a horizontal cross-sectional view taken generally along line 4—4 of FIGURE 2;

FIGURE 5 is a fragmentary elevational view taken generally along line 5—5 of FIGURE 1; and FIGURE 6 is a schematic circuit diagram of a control rod drive system for a nuclear reactor in accordance with the present invention.

Figures 1, 2:
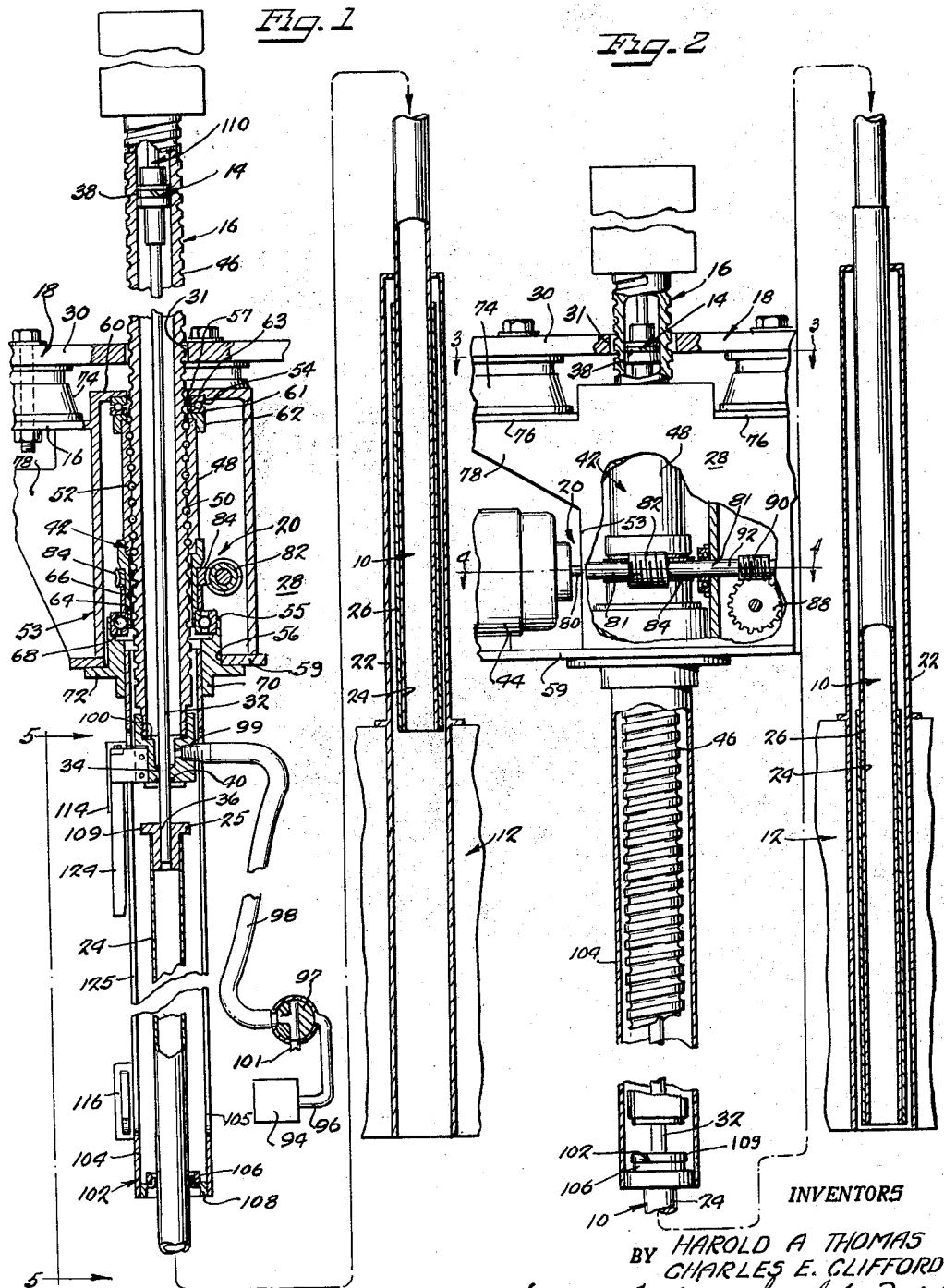
FIGURE 1 is a schematic vertical cross-sectional view of a control rod drive system for a reactor in accordance with the present invention, the control rod being shown in its fully withdrawn position.
FIGURE 2 is a schematic elevational side view of the control rod drive system shown in FIGURE 1 with portions being broken away to show the internal structure thereof and with the control rod being shown in its fully inserted position.

Generally, a control rod drive system as illustrated in the drawings, includes a neutron absorbing control rod 10 movable vertically relative to a nuclear reactor core 12, to thereby vary the neutron losses in the core 12. The control rod 10 is connected to a piston 14 which is movably disposed within a vertically extending cylinder 16, the cylinder 16 being supported above the reactor core 12 by a support means 18. The piston 14 is moved relative to the cylinder 16 by fluid pressure which is applied to the lower end of the cylinder 16. The cylinder 16 itself is moved relative to the support means 18 by a drive means 20.

More specifically, in the illustrated embodiment, the control system is employed to move the control rod 10 to and from the reactor core 12 from a position above the reactor core 12. Although the invention will be described primarily with respect to a control system for moving a single control rod, it will be understood that if desired a plurality of control rods may be similarly controlled. Furthermore, it is contemplated that the control system of the type described herein may be utilized to advantage either alone or in combination with other forms of safety control means.

While many different types of reactors may be utilized, for purposes of this invention, it is preferred that the reactor core be constructed with fuel of the type shown in the aforementioned pending application, Serial No. 732,415, now U.S. Patent 3,127,325. The core 12 is located in a tank (not shown) which is filled with a suitable liquid, such as water, which liquid serves as a radiation shield.

A vertically extending, tubular guide tube 22 for the control rod 10 is disposed within, and is supported by, the core 12 of the reactor. The guide tube 22 serves to guide the movement of the control rod 10 and extends a sufficient distance above the reactor core 12 to permit the control rod 10 to be lifted to a position wherein the control rod is substantially out of the reactor core 12, as shown in FIGURE 1, hereinafter referred to as the fully withdrawn position.

As shown in the drawings, the control rod 10 is slidably disposed in the guide tube 22 for vertical movement relative thereto. Preferably, for purposes which will be hereinafter described, the control rod 10 includes an elongated, vertically extending tubular member 24 of a low weight and non-corrodible material such as aluminum. For convenience of manufacture, the tubular member 24 may be made in a plurality of telescoped sections. The tubular member 24 is open at its lower end, and the upper end thereof is provided with a connecting plug 25.

The lower portion of the tubular member 24 is provided with a coating 26 of a material having a large neutron capture cross-section such as cadmium, boron or boron carbide. The thickness of the coating 26 depends upon the reduction in reactivity that is desired when the control rod 10 is fully inserted into the reactor core 12.

In the illustrated embodiment, the control rod 10 is inserted and withdrawn from the reactor core 12 by the control rod drive mechanism 28. The control rod drive mechanism 28 is supported above the water level of the reactor by the support means which includes a horizontally extending mounting plate 30. The elements of the control rod drive mechanism 28 depend from the mounting plate 30 with the cylinder 16 extending through an aperture 31 in the plate 30. The mounting plate 30 is supported by a suitable means, such as the upper framework (not shown) of the reactor.

The control rod drive mechanism 28 includes the cylinder 16, which is elongated and vertically disposed in coaxial relationship with the control rod 10. The piston 14, which is slidably disposed in the cylinder 16, is connected to the control rod 10 by a vertically extending connecting rod 32. As illustrated in FIGURE 1, the connecting rod 32 extends through an aperture 34 in the lower wall of the cylinder 16 and is fixedly engaged with a central aperture 36 in the plug 25. The piston 14 is provided with a resilient seal 38, which ensures fluid tight engagement between the periphery of the piston 14 and the inner periphery of the cylinder 16. A suitable resilient seal 40 is interposed between contiguous surfaces of the aperture 34 and the connecting rod 32 to prevent leakage of fluid from the interior of the cylinder 16.

The cylinder 16 is moved vertically relative to the mounting plate 30 by the drive means 20 which, in the illustrated embodiment, includes a ball-screw and nut assembly 42 and a reversible, direct current drive motor 44 in driving engagement with the assembly 42. The outer periphery of the cylinder 16 is provided with a spiral groove 46 of essentially semi-circular configuration which serves as the screw element of the assembly 42. The cylinder 16 is threadedly engaged with a concentric tubular nut 48 by means of a plurality of balls 50, the inner periphery of the nut 48 being provided with a spiral groove 52 which corresponds with the groove 46 on the cylinder 16.

As shown in FIGURE 1, the tubular nut 48 is rotatably mounted in a rectangular gear housing 53 by an upper ball bearing 54 and a lower ball bearing 55, the cylinder 16 extending through apertures 56 and 57 in the lower and upper walls 59 and 60, respectively, of the housing 53. The upper bearing 54, which serves as a thrust bearing, is retained in position between a shoulder 61 on an upper adapter 62, which is suitably connected to the upper end of the tubular nut 48, and a shoulder 63 in the upper wall 60. The lower bearing 55, which serves as a radial bearing, is retained in position between a shoulder 64 on a lower tubular adapter 66, which is suitably connected to the lower end of the tubular nut 48, and an internal shoulder 68 at the upper end of a tubular mounting member 70. The mounting member 70 is disposed in concentric relationship with the cylinder 16, and is provided with a flange 72 whereby the mounting member 70 is suitably connected to the lower wall 59 of the housing 53.

As shown in FIGURES 1, 2 and 3 the housing 53 is carried by the mounting plate 30 through the agency of three shock absorbers 74, the purpose of which is hereinafter described. The shock absorbers 74 are disposed between the lower surface of the plate 30 and horizontally extending plates 76 suitably connected to the housing 54. Suitable gusset plates 78 are connected between the plates 6 and the housing 54 to add rigidity to the structure.

As shown particularly in FIGURES 2 and 4, the ball-screw and nut assembly 42 is driven by the drive motor 44, the motor 44 being suitably mounted on an extension of the lower wall 59 of the housing 53. The shaft 80 of the drive motor 44 is fixedly connected to one end of a drive shaft 81 of a worm 82, which drive shaft 81 is suitably journalled in the housing 53. The worm 82 meshes with a worm gear 84, which is suitably connected to the lower adaptor 66 intermediate its ends.

The other end of the drive shaft 81 of the worm 82 is in driving engagement with a means for indicating the position of the cylinder 16, such as a potentiometer 86. As illustrated particularly in FIGURES 2 and 4, driving engagement is provided by a worm gear 88, which is suitably connected to the shaft of the potentiometer 86, and a worm 90 meshed therewith. The worm 90 is suitably connected to an extension 92 of the drive shaft 81. The potentiometer 86 is suitably mounted to an extension of the lower wall 59 of the housing 53.

The piston 14 is moved within the cylinder 16 by fluid pressure, which, for example, may be air pressure. As shown in FIGURE 1, the fluid pressure is supplied by a suitable source 94 which is connected by a conduit 96 to a solenoid operated two-way valve 97. A second conduit 98 is connected between the valve 97 and an inlet connection 99 at the lower end of the cylinder 16. An internal shoulder 100 is provided in the cylinder 16 above the connection 99, the shoulder 100 acting as a lower stop for the piston whereby fluid pressure always enters the cylinder 16 below the piston 14. The conduit 98 between the valve 97 and the inlet connection 99 is made of flexible material so as to permit vertical movement of the cylinder 16.

In the illustrated embodiment, the valve 97 is arranged so that when it is activated, the source 94 is in communication with the lower portion of the cylinder 16 and when the valve 97 is deactivated, as shown in FIGURE 1, the lower portion of the cylinder is in communication with an outlet conduit 101.

The length of the connecting rod 32 is made such that when the control rod 10 is in its fully inserted position, and the cylinder 16 is in its lowermost position, the piston 14 is at the upper end of the cylinder 16, as shown in FIGURE 2. The cylinder 16 is made of a length such that when the cylinder 16 is in its uppermost position and the piston 14 is held against the upper end of the cylinder 16 by pressure within the lower portion of the cylinder 16, the control rod 10 is in its fully withdrawn position, as shown in FIGURE 1.

The control rod 10 is stopped, when it is dropped or scrammed by a damping means 102 disposed at the lower end of a vertically extending, elongated guide tube 104. The guide tube 104 is disposed in concentric relationship with the connecting rod 32 and is suitably connected at its upper end to the mounting member 70. A vertically extending slot 105 is provided in the guide tube 104 to permit vertical movement of the cylinder 16.

In the illustrated embodiment the damping means 102 includes a resilient tubular member 106 which is suitably supported in concentric relationship with the tubular member 24 by a lower wall 108 of the guide tube 104. When the control rod 10 is dropped, the lower surface of a flange 109 on the plug 25 engages the upper surface of the member 106. The above described damping means may be employed because of the short movement of the control rod 10, and the relatively light weight of its tubular construction. For a longer movement and a heavier control rod, other damping means may be necessary (e.g., a dash pot).

The upper end of the cylinder 16 is provided with a damping means 110 for decelerating the piston 14 when it is suddenly moved to the upper end of the cylinder 16. The illustrated damping means 110 is a shock absorber similar in construction to the one commonly employed in an automobile. The previously mentioned shock absorbers 74 serve to reduce the shock transmitted to the supporting plate 30, when the piston 14 is decelerated.

In the illustrated embodiment, provision is made for electrically limiting the vertical movement of the cylinder 16 to prevent damage to the apparatus by excessive movement of the cylinder 16 and to indicate when the control rod 14 is fully inserted. To this end, as shown in FIGURE 5, three switches 112, 114 and 116 are provided on the guide tube 104.

The lower switch 112 serves to indicate when the control rod 10 is fully inserted. The switch 112 is suitably mounted to the lower portion of the guide tube 104 with its operating lever 118 extending through a slot 120 in the guide tube 104. The operating lever 118 is actuated by the flange 109, which is disposed at the upper end of the control rod 10. The switch 112 is connected into a conventional indicating circuit (not shown) which energizes a signal light when the switch 112 is activated.

The switches 114 and 116 serve respectively to electrically limit the upward and downward movement of the cylinder 16. The switches 114 and 116 are suitably mounted on the guide tube 104 and are operated by a cam 122 on a downwardly extending arm 124 which extends through a longitudinally extending slot 125 in the guide tube 104, and is suitably connected to the lower end of the cylinder 14. The switches 114 and 116 are connected into conventional limit switch circuits (not shown) which de-energize the drive motor 44 when either of the switches 114 and 116 are activated.

A fourth switch 126 is positioned on the guide tube 102 below the upper limit switch 114. The fourth switch 126 serves, for example, to stop the movement of the cylinder 16 at a predetermined position in its travel, thereby stopping the cylinder 16 when a predetermined total amount of reactivity has been inserted into the reactor. The fourth switch 126 may also serve as an interlock switch to prevent the application of fluid pressure (pulsing) if the cylinder 16 is withdrawn beyond a limit determined by the switch 126. In this way, the amount of reactivity that can be rapidly inserted is limited without limiting the amount of reactivity that can be inserted slowly by the motor drive.

The switch 126 is actuated by the arm 124 and the arm 124 is made of such a length that the microswitch 126 remains actuated for any position of the cylinder 16 above its initial actuation position. The mounting plate 128 of the switch 126 is suitably mounted to a bracket 130, which is attached to the guide tube 102 to enable the switch 126 to be adjustable vertically.

The above described control rod drive system may be employed for various functions in a nuclear reactor. For example, the system may be employed in an application wherein a control rod is automatically and continuously positioned to regulate the steady state operation of a reactor. When employed in this application the valve 97 is maintained in an open position whereby pressure in the lower portion of the cylinder 16 maintains the piston 14 against the upper end wall of the cylinder 16. The drive means 20 is actuated to either withdraw or insert the control rod 10.

The control rod drive system may also be employed in an application wherein a safety or scram rod is instantaneously dropped. When employed in such an application the valve 97 is maintained in an open position until the scram rod is to be dropped. The drive means 20 is employed to move the cylinder 16 to any desired position. To scram the rod, valve 97 is de-activated (closed), thereby releasing pressure in the cylinder 16 and dropping the rod into the reactor.

The described control rod drive system may be employed for pulsing a reactor having a prompt negative temperature coefficient. When employed for this purpose, the drive means 20 is actuated to move the cylinder 16 to a position which allows insertion of a predetermined amount of reactivity into the reactor. The position of the cylinder is readily determined by the indicating means 86 in the normal fashion. The valve 97 is then opened and the resulting pressure in the lower portion of the cylinder 16 rapidly moves the piston 14, to the upper end of the cylinder 16, thereby inserting the desired reactivity into the reactor.

The control rod 10, shown in FIGURES 1 and 2, is especially adapted for use in a control rod drive system for pulsing the reactor. Since the control rod is of tubular construction it has a low mass and displaces a minimum amount of water, which features permit the rapid movement of the control rod.

In a reactor having a prompt negative temperature coefficient the control rod drive system described herein may also be employed in combination with a conventional regulating control rod drive system to produce a rapid power rise of the reactor to a predetermined level with little or no overshoot. With such a control system, the reactor may be operated to provide, for example, a square pulse of power, or a rapid and automatic start up of the reactor.

In a reactor, an increase in the inserted reactivity results in an increase in the power output which, in turn, causes an increase in the temperature of the fuel elements. The increase in temperature of the fuel elements in a reactor having a prompt negative temperature coefficient causes a decrease in the reactivity. The reactivity is reduced further by the delayed temperature coefficient which results from the entire reactor heating up. To provide a step function of power in such a reactor, a step reactivity insertion is required to bring the reactor near to prompt critical. An additional reactivity insertion is then required to compensate for the negative reactivity being introduced by the temperature rise of the fuel elements. The rate of required reactivity insertion varies with the temperature of the fuel elements, the reactor construction, and the amplitude of the power rise.

A control circuit such as that shown in FIGURE 6 may be employed to automatically control the positioning of the control rod 10 and the regulating rod 132 in order to provide reactivity insertion rates which approximate the rate required to provide a perfect step function of power. The regulating rod 132 is positioned relative to the reactor core 12 by a reversible, variable speed motor 134. The motor 134 is connected to the output of a conventional servo amplifier 136 wherein the signals from a power level indicator 138 and a period indicator 140 are suitably compared with the signal from a power demand control 142 to provide an error signal to control the servo system 136. The servo amplifier 136 is connected through an on-off switch 144 to an alternating current power source (not shown).

Direct current power is provided for the drive motor 44 of the control rod 10 by a rectifier 146 which is connected to the power source through an on-off switch 148. The field coil 150 of the motor 44 is connected across the output of the rectifier 146. The armature 152 of the motor 44 is connected in series with a normally closed contact 154 of a relay 156 and a pair of potentiometers 158 and 160, and the series combination is connected across the output of the rectifier 146. A normally closed contact 162 of a relay 164 is connected in parallel with the potentiometer 158.

As shown in FIGURE 6, the relays 156 and 164 are coupled, respectively, to thermocouples 166 and 168 which are disposed in thermal relationship with one of the fuel elements 170 in the reactor core 12. The thermocouples 166 and 168 are disposed to actuate the respective relays 156 and 164 at preselected temperatures of the fuel element.

The solenoid of the valve 97 is connected through an on-off switch 172 to the power source.

The cylinder 16 is initially moved to a position wherein a reactivity, which brings the reactor near prompt critical, will be inserted into the reactor when the valve 97 is opened. The cylinder 16 is moved to such a position, without moving the control rod 10 and the regulating rod 132, by opening switches 144 and 172 and closing switch 148.

The step function of power is then obtained by adjusting the power demand control 142 to the desired level and closing all of the switches 144, 148 and 172 whereby the D.-C. rectifier 146, the servo system 136 and the valve 97 are energized. The piston 14 is thus moved instantaneously to the upper end of the cylinder 16 thereby withdrawing the control rod 10 to a position wherein the predetermined reactivity is inserted into the reactor. The drive motor 44 then withdraws the control rod 10 at a rate which is dependent upon the setting of the potentiometer 160. The potentiometer 160 is preset at a resistance which permits additional reactivity to be inserted at a sufficient rate into the reactor to approximately compensate for the initial rate of decrease in reactivity caused by the temperature rise of the fuel.

As previously indicated, the required rate of insertion of reactivity varies at different temperature levels, and hence for proper control, the rate of reactivity insertion is changed. This is accomplished in the illustrated control circuit by designing the thermocouple 168 so that it develops sufficient voltage to energize the relay 164 when the fuel temperature reaches a predetermined temperature. The contact 162 is thereby opened and potentiometer 158 is inserted in series with the armature 152. The potentiometer 158 is preset to provide a rate of reactivity which approximately compensates for the rate of decrease in reactivity in the temperature range above the preselected temperature.

When the fuel temperature reaches a second predetermined temperature, which is approximately a temperature at which the reactor is to operate, the thermocouple 166 develops sufficient voltage to energize the relay 156, thereby opening the contact 154. As shown in FIGURE 6, when contact 154 opens, the circuit to the armature 152 opens, thereby stopping the motor 44.

Because, for example, the required rate of reactivity insertion varies as a smooth curve, the above described programming only approximates the reactivity requirements to provide the rapid rise in power. In the illustrated embodiment, the regulating rod 132 which is controlled by the servo system 136 is employed to make the necessary minor corrections in the rate of reactivity. However, the control rod 10 may be controlled by a suitable servo system in order to make the minor corrections.

The temperature settings of the thermocouples 166 and 168, depend upon the variation in the negative temperature coefficient of the particular fuel in certain temperature ranges. The settings of the potentiometers 158 and 160 depend upon the amplitude of the power rise desired. The potentiometers 158 and 160 may conveniently be mechanically connected to the power demand control 142 so that when the power demand is adjusted the potentiometers 158 and 160 are correspondingly adjusted. The resistance of the potentiometers 158 and 160 and the temperature settings of the thermocouples 166 and 168 may be predetermined by calculating, based upon the period of the reactor, the necessary reactivity insertion to approximately provide a step rise in the proper level.

The above described control system is capable of providing a rapid and automatic startup of the reactor to a predetermined power level in a few seconds. To provide a square pulse of power output, pressure is released from the lower portion of the cylinder 16 after a desired length of time. The control rod 10 thus drops into the reactor and shuts down the reactor.

As can be seen from the above, a control rod drive system is provided which may be employed for various purposes in a reactor. With the described control rod drive system either a controlled instantaneous or a controlled slow movement of the control rod may be obtained.

Various changes and modifications may be made in the above described control rod drive system without departing from the spirit or scope of the present invention. Various features of the invention are set forth in the accompanying claims.

What is claimed is:

1. A control rod drive system for a nuclear reactor, comprising a support means, a cylinder carried by said support means for movement relative thereto, a piston movable within said cylinder, a control rod, means connecting said piston to said control rod, motor means directly connected to said cylinder for axially moving said cylinder relative to said support means, a source of fluid pressure, means connecting said source of fluid pressure to said cylinder so that said piston is moved in one direction by said pressure, and means for controlling the fluid pressure applied to said cylinder.

2. A control rod drive system for a nuclear reactor, comprising a vertically extending control rod, a support means disposed above said control rod, a vertically extending cylinder carried by said support means for vertical movement, a piston movable within said cylinder, means connecting said piston to the upper end of said control rod, motor means directly connected to said cylinder for vertically moving said cylinder relative to said support means, a source of fluid pressure, means connecting said source to said cylinder so that said piston is moved upwardly by said pressure, and means for controlling the fluid pressure applied to said cylinder.

3. A control rod drive system for a nuclear reactor, comprising a vertically extending control rod, a support means disposed above said control rod, a vertically extending cylinder carried by said support means for vertical movement and in coaxial relationship with said control rod, a piston movable within said cylinder, means connecting said piston to the upper end of said control rod, motor means directly connected to said cylinder for vertically moving said cylinder relative to said support means, a source of fluid pressure, an inlet connection at the lower end of said cylinder, means connecting said source to said connection, and control means on said connecting means for controlling the fluid pressure in said cylinder.

4. A control rod drive system for a nuclear reactor, comprising a vertically extending control rod, a support means disposed above said control rod, a vertically extending cylinder carried by said support member for vertical movement and in coaxial relationship with said control rod, a piston movable within said cylinder, means connecting said piston to the upper end of said control rod, means connected to said cylinder for moving said cylinder relative to said support means, a source of fluid pressure, an inlet connection at the lower end of said cylinder, means connecting said source to said connection, control means on said connecting means for controlling the fluid pressure in said cylinder, damping means on said cylinder for decelerating said piston at the end of its upward movement, and a second damping means on said support means for decelerating said piston at the end of its downward movement.

5. A control rod drive system for a nuclear reactor, comprising a vertically extending control rod movably disposed in the reactor, said control rod having a hollow core and an open lower end, a support means disposed above said control rod, a vertically extending cylinder carried by said support means for vertical movement, a piston movable within said cylinder, means connecting said piston to the upper end of said control rod, motor means directly connected to said cylinder for vertically moving said cylinder relative to said support means, a source of fluid pressure, means connecting said source to said cylinder so that said piston is moved upwardly by said pressure, and means for controlling the fluid pressure applied to said cylinder.

6. A control rod drive system for raising the power level of a nuclear reactor having a prompt negative temperature coefficient, said system comprising a first control rod in said reactor, means for instantaneously withdrawing said first control rod to a predetermined position whereby the reactivity of the reactor is raised to a predetermined level, additional means for withdrawing said first control rod at a predetermined rate, means responsive to the temperature of a fuel element in the reactor for stopping said first control rod when said control rod has been withdrawn from the reactor to a position at which the fuel element is approximately at its desired operating temperature, a second control rod in said reactor, drive means for moving said second control rod and means responsive to the difference between the power level of the reactor and the desired power level and connected to the drive means for controlling said drive means so as to move said second control rod to a position in said reactor wherein sufficient reactivity is inserted by said second control rod to raise the power level of the reactor to the desired level.

7. A control rod drive system for raising the power level of a nuclear reactor having a prompt negative temperature coefficient, said system comprising a first control rod in said reactor, and automatic control means including means for instantaneously withdrawing said first control rod to a position wherein the reactor is near prompt critical, additional means for withdrawing said first control rod at a predetermined rate, means responsive to the temperature of a fuel element in the reactor for stopping the movement of said first control rod when said control rod has been withdrawn from the reactor to a position at which the fuel element is approximately at its desired operating temperature, a second control rod in said reactor, drive means for moving said second control rod, and means responsive to the difference between the power level of the reactor and the desired power level and connected to the drive means for controlling said drive means so as to move said second control rod to a position in said reactor wherein the reactivity inserted by said second control rod equals the difference between the reactivity required in said reactor to raise the power to a desired level and the reactivity inserted by said first control rod.

8. A control rod drive system for raising the power level of a nuclear reactor having a prompt negative temperature coefficient, said system comprising a first control rod in said reactor, a support means disposed above said first control rod, a cylinder carried by said support means for vertical movement, a piston movable within said cylinder, means for connecting said piston to said first control rod, drive means for moving said cylinder relative to said support means, means for controlling the rate at which said drive means moves said cylinder, a source of fluid pressure, means for connecting said source of fluid pressure to said cylinder so that said piston is moved in one direction by said pressure, means for controlling the fluid pressure applied to said cylinder, a second control rod, drive means for moving said second control rod, and means for controlling said second mentioned drive means so that said second control rod is moved to a position wherein the reactivity inserted by said second control rod equals the difference between the reactivity required in said reactor to raise the power to a desired level and the reactivity inserted by said first control rod.

References Cited in the file of this patent

UNITED STATES PATENTS

| | | |
|---|---|---|
| 2,725,993 | Smith | Dec. 6, 1955 |
| 2,781,308 | Creutz et al. | Feb. 12, 1957 |
| 2,855,899 | Beaty | Oct. 14, 1958 |
| 2,857,324 | Boisblanc et al. | Oct. 21, 1958 |
| 2,890,158 | Ohlinger et al. | June 9, 1959 |
| 2,937,984 | Chapellier | May 24, 1960 |
| 2,990,356 | Chapellier et al. | June 27, 1961 |
| 3,106,519 | Schwan et al. | Oct. 8, 1963 |

FOREIGN PATENTS

| | | |
|---|---|---|
| 1,045,565 | Germany | Dec. 4, 1958 |
| 1,174,620 | France | Nov. 3, 1958 |